Aug. 17, 1937. K. R. HOYT 2,090,398
STEREO REFRACTOR OPTICAL SYSTEM
Filed Jan. 18, 1936 2 Sheets—Sheet 1
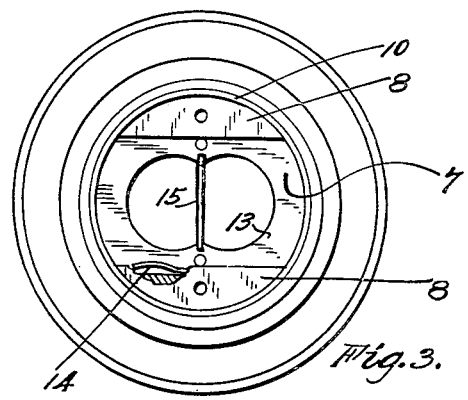
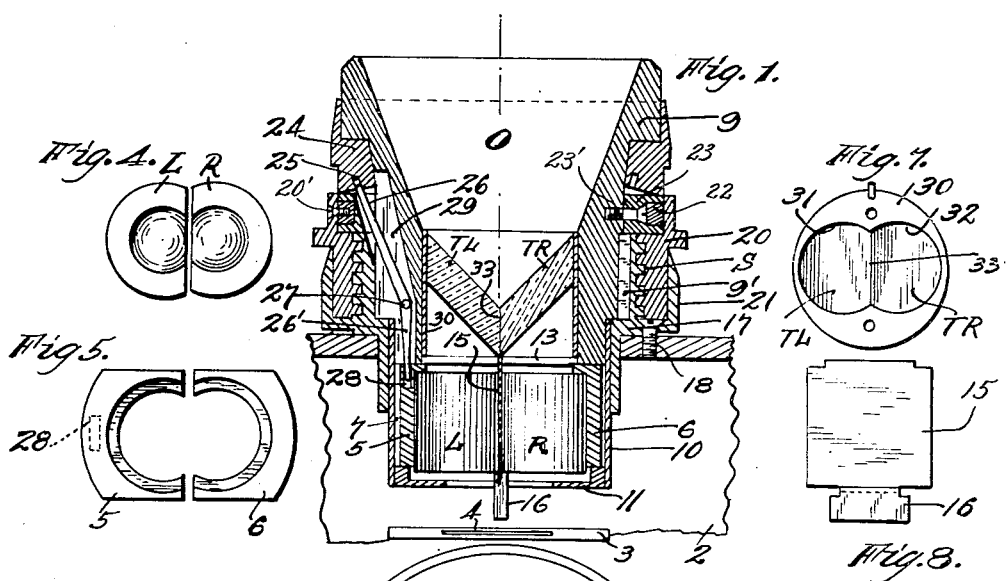
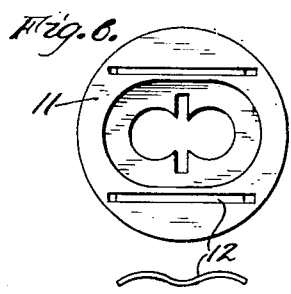
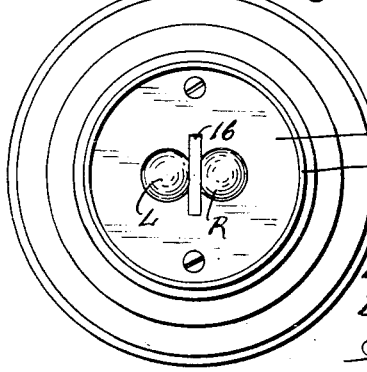
Inventor,
Karl R. Hoyt,
By

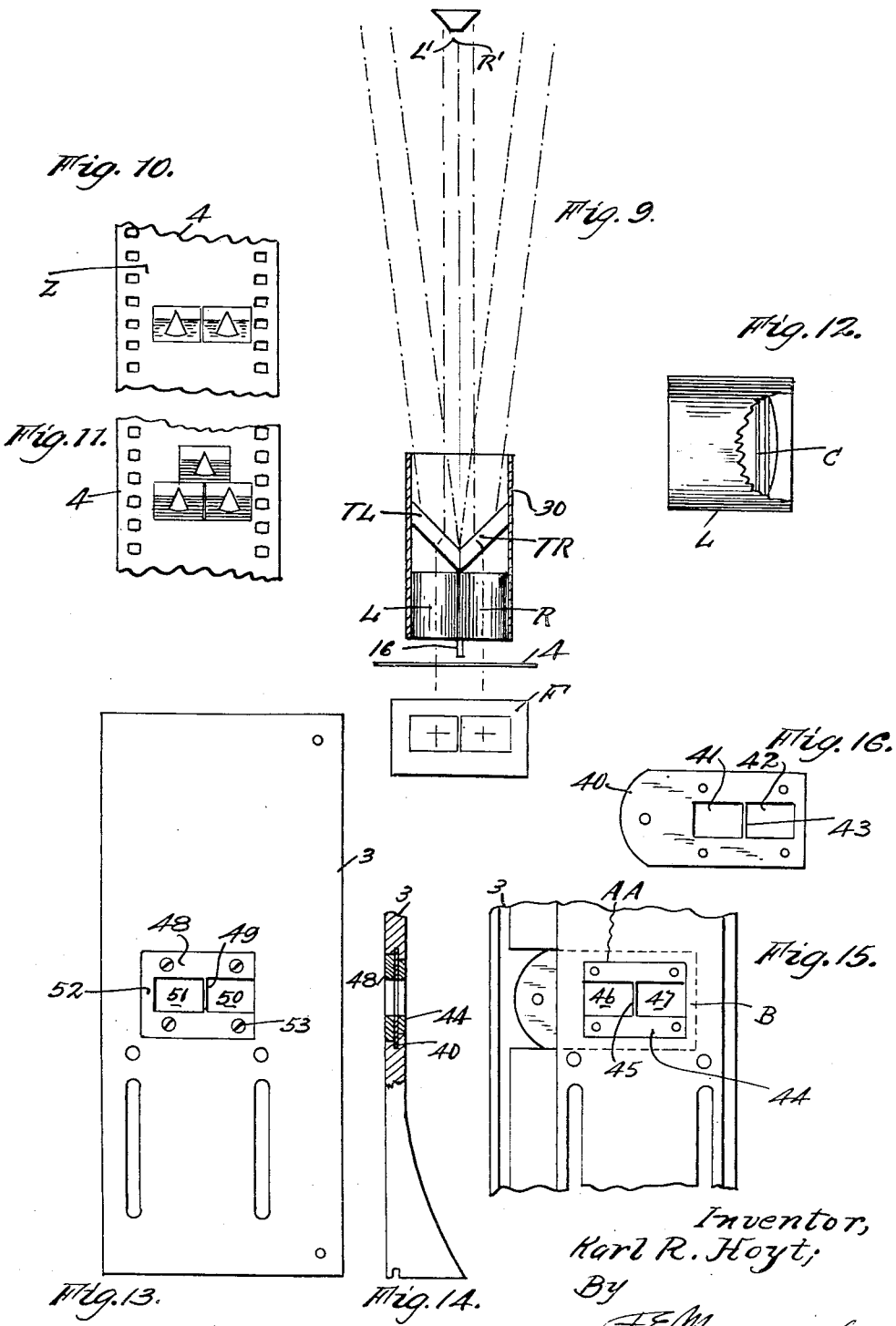

Patented Aug. 17, 1937

2,090,398

UNITED STATES PATENT OFFICE 2,090,398

STEREO-REFRACTOR OPTICAL SYSTEM

Karl R. Hoyt, Los Angeles, Calif., assignor to Telco System Inc., a corporation of California Application January 18, 1936, Serial No. 59,701

24 Claims. (Cl. 88—16.6)

This invention is an oblique-refractor, binocular lens system with provision for both focal accommodation and the correction of parallax variation incident to distance change of the object, and pertains to animated picture photography, with or without color combination, though not necessarily so limited.

It has long been proposed to make stereoscopic motion picture negatives and their positives and to project a composite thereof onto a screen but because of the difficulty of making a perfect composite registration of the plural images and because of imperfections resultant from variation therein due to parallactic phenomena only fair results have been achieved in making pictures lying in the infinite focal range of the lens system where all of the light waves to the system are considered parallel, and therefore paraxial to the mean optical line of the system; that is, the medial line of the interlens distance.

When pictures are made of scenes or objects short of the infinity range of the binocular lenses and within the adjustable focal range of the lens system then there must be compensation made for the fact that with change of object distance there is a considerable effect from change of the parallax as between the views of the dual objective lenses of the system.

This parallax effect varies constantly with the change in the object range. In the human eye accommodation for focal distance and angular correction for parallax is natural and automatic in normalcy; though the interpupillary distance is constant.

It is an object of the present invention to provide a mechanical, optical system which will approximate the natural eye effect as closely as possible with as simple a means as is practical to produce a stereoscopic negative.

Also, an object is to provide for the production of twin, right and left pictures (negative images) side by side across a strip of commercial size, motion picture film, with the least light intercepting media and in the most direct path.

Further, an object is to provide a highly compact and efficient binocular lens system in the form of a single unit bodily attachable to a given camera box, and including a single control for concurrent adjustment of the two lenses for focal purposes, and in which unit the optical axes of the two lenses are well within the transverse dimension of the available area, for images, of the given film strip. In other words, the lateral relation of the lenses is such that the pencils of light to the picture area of the strip are directly from the lenses without intercepting optical media for high light and field of view efficiency.

An additional object is to provide in combination with a binocular lens set a dioptric media by which the light from a scene or object can be paraxially altered on its traverse to the lens. That is to say, that in making pictures with infinity focus the dioptric media may be so disposed as to the set of lenses that the parallel pencils flowing from the object to the lenses will be refracted to closer parallelism whereby to reduce the ocular pencil distance and consequently bring a central target point (in the object scene) inward toward the relative lens axis. Or, conversely, for pictures taken within the variable focus range of the lens system the refractor will be so arranged that the parallel rays or pencils from the object to the lenses will be so refracted as to increase their ocular separation, speaking, of course, of the pencils as a whole to each lens.

This control of the parallactic effect by refraction of the pencils is important since it has to do with production of images on a strip of film of given width and whose picture area presents a fixed available dimension onto which must be projected like images side by side across the strip.

Therefore, an object of the invention is to provide means for the accurate registration or coincidence of a selected or arbitrary, central target mark, coming to each lens from the object or scene being photographed, with a focussing screen center mark of which there is one for each lens of the system and which mark is on the optical center of the relative "frame" area of the negative.

Inasmuch as the selected "target mark" in the scene will relatively parallactically shift in the ground-glass images as the object distance changes as to the camera, it is a purpose to provide for correction of this lateral shift so that the target mark, of the scene, can be readily moved so as to register or coincide on the respective ground-glass optical center, for each lens of the group. Each lens receives a full strength pencil of light from the object-scene and each pencil is definitely registered on the multi-center ground-glass by inter-ocular adjustment of the lenses as needed to coordinate the parallax effect as the object distance may require.

An important advantage of this system and method is that no additional lighting power is needed over the conventional practice in taking motion pictures with the usual mono-lens camera.

Due to the inter-ocular spacing of the plural lenses, one lens will pick up a full-lighted front and right side field of view while the other lens will receive a full-lighted front and left-side field of view, and in consequence, these full strength views are prepared for true superimposition by their careful centralization on respective focussing screens.

Thus, means are here provided whereby the lenses are inter-ocularly adjusted to bring a selected target mark into a line from each lens direct to the respective ground glass focussing center mark. When exposure and development is completed the images will thus be substantially identic as to centers on the twin frames. When positive transparencies are produced from the negatives their images may be composited with utmost accuracy of coincidence on a screen surface.

Further, the system purposes to greatly facilitate the production of colored cinema projection.

With a fixed, inter-frame center distance on a given width film strip and with a binocular lens set whose normal inter-lens space is equal to the inter-frame distance when taking a view of close focus, as the distance of the object-scene is increased and the lens set is adjusted to focus on the ground glass the parallactic effect causes a material difference in the images from the lenses and this difference is here corrected to make the two images centrally alike by optically centering arbitrary marks of the scene on the center of the focussing screen.

Therefore, as a moving object at infinity of the lens system moves toward the camera and into the ajustable focussing range the cameraman gradually changes his lens focus to keep the object sharp and the present invention provides for the gradual change of the inter-lens space of the binoculars to compensate for incidental parallax variation.

The invention consists of several advancements in this art as set forth in the ensuing disclosure and having, with the above additional objects and advantages as hereinafter developed, and whose method, and construction, combination and details of means, and the manner of operation will be made manifest in the description of the herewith illustrative embodiment; it being understood that modifications, variations and adaptations may be resorted to within the scope, principle and spirit of the invention as it is more directly claimed hereinbelow.

Figure 1 is an axial section of the optical apparatus of the camera. Figure 2 is an inner, end elevation. Figure 3 is an inner end elevation of the lens supporting body. Figure 4 is an inner end view of the twin lenses, in their photographing relation. Figure 5 is an inner end view of the unloaded, lens carrying blocks. Figure 6 is a front elevation of the rear lens cover and light stop. Figure 7 is a front elevation of the refractor device. Figure 8 is a plan of the axial light blind which is provided to separate the beams of light of the separate lenses. Figure 9 is a light passage diagram. Figures 10 and 11 show fragments of group image negatives. Figure 12 is a detail of a lens with a color filter. Fig. 13 is a front elevation of an aperture plate with an applied adapter for twin exposure on a "frame." Fig. 14 is a vertical section and Fig. 15 is a rear elevation of a portion of the plate. Fig. 16 is a face view of the detached slide of the adapter.

The illustrated adaptation of the invention incorporates a conventional motion picture camera 2 having a transversely twined aperture plate 3 past which feeds a negative film strip 4, of, for instance 35 mm. width, the intermittent advance of which is of regular or standard length of feed step of about 19 mms. as for the exposure of the full area of the usual picture "frame" for such a width of film.

But this disclosure incorporates a binocular lens system of approved, coplanar, equi-power, photographic lenses L and R which have an interocular distance of about .420 of an inch at minimum with the result that the photographic centers at the focal plane and of the twin apertures of the aperture plate 3 will be of the same dimension. With such an inter-axial distance in the lens set and with the focussing screen centers spaced equally on the sides of the optical line of the unit (as between the lenses) it will be seen that the width of these twin frames will be something less than .420" for there must be allowance for an intervening blind or separator.

Therefore, in this example, the twin frames, of a negative, have a width and height of about one-half of the usual "frame" on a 35 mm. strip, or other size strip, such as 8, 16, 70 millimeters.

This enables the run of the film to first expose a series of twin frames of one-half size of the standard and employing standard film, feed steps, and then the later run of the film to utilize the unexposed one-half of each full frame area of the usual "frame". Hence no change is made in the standard feed gear or in the shutter action. The only change is in the aperture plate; a simple matter of current practice, and the replacement of the mono-lens attachment by the binocular unit of this invention.

It is an object to secure this latter change in the simplest manner by providing a complete lens and focussing combination bodily attachable to the camera in replacement of the usual single lens.

For the purpose of permitting the lenses to be brought to the desired inter-ocular distance they are each chordally flatted on one side (Fig. 4) and for the purpose of readily effecting a desired, parallax correcting adjustment they are severally rigidly fixed in flat-sided, segmental blocks 5 and 6 which are snugly telescopic in paraxial positions in a chamber 7, Fig. 3, formed between parallel, plane-faced, segmental walls 8 of, and extending rearwardly from, a main, tubular body 9.

A tube 10 is fixed on the circumference of the walls 8 and encloses the outer faces of the lens blocks 5—6 in their chamber 7, and an axially apertured, posterior disc 11 closes the shielding tube 10 and has springs 12 firmly thrusting the lens blocks inward against a transverse, apertured partition 13 in the bore of the body 9. A spring 14, on a wall 8, acts to thrust the blocks 5—6 laterally so that they are held against undesired vibration in the chamber 7.

A diametrical light stop 15 is fixed on the axis of the tubular body 9 and extends, between the blocks 5—6, rearwardly from partition 13 to the back wall disc 11 and mortices into a coplanar, rear-end light separator 16 which terminates adjacent to the aperture plate 3.

For the purpose of effecting focal adjustment of the identic-power lenses L—R, when objects are closer than the infinity of the lenses, the body 9 is splined, as by key 9', for sliding movement in a basal sleeve 17, fixed by screws 18 to the camera face, and has exterior screw-threads S closely fitted by a focussing collar 20 which telescopes into an index band 21 of the mounting sleeve 17.

The focussing collar 20 is here fixed 20′ to a sectional ring 22 which snugly fits and turns in a groove in an anchor ring 23 fixed by a screw 23′ to the body 9 of the unit.

It is well understood that the object distance change when photographing with a camera using binoculars or stereo-lenses results in a material change in the stereoscopic images of the scene and a feature of this invention is the provision of means for the ready correction of this effect so as to keep a central scene or object point as near as may be practical on the center mark of the focussing screen of the camera at all changes of the object distance; with or without focal adjustment of the camera lens.

To accomplish this there is snugly mounted for rotation on the body 9 a parallax adjusting ring 24 with an index flange overlapping the enlarged, forward, mouth end of the body 9. The rear end face of the parallax ring 24 has an eccentric channel 25 and in it lies one end 26 of longitudinal lever pivoted at 27 and whose opposite end 26′ engages in a slot 28 in the front face end of the lens block 5; the ring 23 and the body 9 having a recess 29 for the lever 26—26′.

Hence, irrespective of the focal adjustment of the lens-carrying body 9, as to the focussing plane in the aperture plate, it is possible to correct or control parallax object displacement by simply turning the adjustment ring 24 to rock the lever so as to shift the radially movable lens and block L—5 outward as the focal distance increases, and conversely for decrement of focal distance until the closest range of focus brings the lenses L—R to the minimum inter-ocular space of .420″, in the case here given.

To control the pencil of light from the scene or object S, on the mean optical line O of the system, a refractive device is fixed, close to the twin lenses L—R, in the light tunnel of the body 9. Since each lens will receive its own full-strength beam or pencil of light from the object or view it is an objective of the invention to increase the paraxial relation of these pencils when the object is in proximate range of the applied lenses (less than infinity) and, when desired, to decrease this relation when the object is at infinity range.

The effect of increasing the paraxial relation is to clearly separate the pencils to a distance commensurate with the inter-axial distance of the binocular lenses, especially for close focussing ranges, and to a great advantage in parallax adjustment, as will be explained.

The refracting device includes a pair of refracting transparencies, in the form of para-plano glass or other suitable media, here shown as elements TL and TR, having parallel, plane sides set in a barrel 30 fixed in the bore of the body 9 and as close to the lenses L—R as practical. The refractive elements relatively converge toward an apex, near the lenses, on the axis of the barrel 30 and each refractor has a cylindrical perimeter snugly fitting in one of paraxial bores 31—32, of the barrel, of equal diameters and intersecting on an axial plane of the barrel; which plane thus forms the chordal base of meeting, flat sides 33 of the refractors, Figs. 1 and 7.

In other words, the refractors TR—TL are oblique-plane, parallel-faced sections of a right cylinder equal to the bore diameter 31 or 32, one side of each refractor being flatted on a chordal line parallel to the axis of its cylinder.

The method of procedure and operation of the device is as follows: the camera lens unit is first focussed, by turning the collar 20, on the target object of a scene for sharpness of image on the focussing screen while sighting through either of the lenses L—R since they are of equal power. In the present combination only one lens is laterally adjustable, the left, and it is preferable to use the right hand, stationary lens R for focussing toward the target. Then, for this focal adjustment, the cameraman sights on the same lens and selects a target line which he registers with a substantially central mark on the relative ground-glass for the twin aperture plate.

While in such focus position of the lens group he observes through the left lens and locates the same target-center line and if the image of it is out of register with the center-mark of the respective left ground-glass, Fig. 9, it is made to so register by turning the parallax ring to shift the adjustable correcting lens, as L, to the right or left until the selected target line coincides with the left focussing screen mark.

It is now apparent that the two images at the focal plane of the camera are not only in sharp focus but, furthermore, the scene-object of each is definitely similar because of parallactic correction secured by the relative adjustment of the lenses L—R to bring a central target line or point into register position of the picture area of each twin aperture 51—50 of the camera.

Having achieved such sharpness of focus and corrected parallax picture views it will be seen that composite reproduction or image projection can be practically made since close register of the plural images is possible, because, as explained above, the photographic images were initially, optically centered by ground-glass focus and binocular perspective correction, that is, parallactically.

By reversing the refractor device to present its apex outward the incident rays will be contracted, that is, in pencils, to emergent pencils on closer parallel paths. This is a desirable effect in distant scene work.

The schematic view, Fig. 9, shows how parallel pencils of light from object L′—R′ are spread by the refractors TL—TR on paths to the lenses L—R, thence to the film at the focal plane, and shows the center-marked focussing screen F for each image of the lens group.

In Fig. 10 is shown a twin-image group film, while Fig. 11 shows a triple image group; it being understood that any practical number of parallel-axis lenses in a coordinate group may be adopted.

The negatives and their positives are preferably produced in conventional black and white, but the present invention lends itself highly useful for color pictures. In such case different color filters C, Fig. 12, are introduced in the light pencil passing to the negative film; as in an effective position between optical parts of the lenses where efficiency will be the highest.

When projecting to a screen from a positive, group-image strip of this system a filter of the same color or a relative shade as used for making the original negative image is introduced on each emergent pencil of light from the coordinate group images with the result that the projected picture images composite the divers colors in the screen view in replica of the original object or scene.

A feature of the invention is that each aperture of the group of the plate 3 has a shape similar and in proportion to the currently used "Academy aperture" of .868" x .631" for a 35 mm. film strip used for photographic sound record pictures. The purpose of this is to have the images projected from the positives, obtained from plural-image strips of the instant system, conform in shape to such projection screens as "Academy aperture" pictures are projected to.

In Figs. 13-16, the aperture plate 3 has an original "Academy aperture" AA at the side of which is a bed B shielding a zone Z of the negative for sound record. Adapting means are here provided for filling the aperture AA to reduce its area to that desired for use with the herein disclosed multi- or group lens unit or attachment. The adapter includes a thin slide 40 transversely telescoping in the plate 3 and having twin apertures 41—42 separated by a narrow, vertical web 43 and otherwise closing the aperture AA of the plate.

Fixed to the rear face of the inserted slide 40 is a filler block 44 which fits in and conforms closely to the aperture AA and has a central web 45, coinciding with the slide web 43, and openings 46—47 extend from web 45 to the ends of the block 44. Fixed to the front face of the slide 40 is a filler block 48 having a web 49 coplanar with web 43 and having an opening 50 extending to one end and registering with opening 46 of block 44. At the opposite of the web 49 is an opening 51 registering with block opening 47; a side bar 52 of the block 48 coinciding with the portion B of the plate 3, Fig. 15. The assembled elements of the adapter are secured in suitable manner, as by means of through screws 53.

The adapter thus provides for ready change of the original aperture AA to the exact size and shape and number of smaller apertures as may best serve the system of group lenses adopted in apparatus incorporating the instant invention.

By this invention numerous advantages accrue in motion picture photography and picture projection therefrom. When projecting in colors there is no color fringe around the objects, and the color of moving objects does not bleed when photographed. Since each of the plural lenses receives a full strength light pencil photographing can be done with no more than the usual light on a set or scene. With the foreground at infinity there is no fringing of the background, and color pictures may be projected at no greater first cost than for black and white effects, and the negatives are developed by the usual practice for black and white film images. What is known in the trade as "duped" negatives can be readily made from the original negative strip.

It is to be understood that there may be cases where no change in lens focus in the camera will be requisite in making pictures and still it may be desirable to correct parallax by relative adjustment of the plural lenses. This is clearly in the capacity of the disclosed system since the means for adjusting parallax is operated without any lens adjustment as to focus.

It will be seen that since the pictures are made in register during photographing that inter-cut scenes may be projected without any adjustment of the projector lens by the projectionist.

It is possible by the provision of the relatively adjustable lenses L—R to bring the target mark of a scene, into desired ground-glass register though the ground glass marks themselves may slightly vary from the inter-ocular lens distance.

From the focussing point of view of the cameraman, the right and left pencils of light are regarded as contracted beyond the refractors TR and TL, in reference to Fig. 9, toward the object L'—R'. The right pencil of light is that to the right lens R, and the left pencil is that to the left lens L, and in practice the right lens is first focussed on the target mark and this is registered on the ground glass, and then the image is next registered through the left lens on the relative ground glass, without change of focus.

What is claimed is:

1. A plurality of equi-power objective lenses, equal refractors oppositely angularly arranged on the respective axes of the lenses, and a tubular support in which the lenses and the refractors are mounted and by which they are all concurrently, axially moved for focal adjustment of the lenses one lens being laterally shiftable in said tube as to its refractor, means in the tube to shift the lens, and an exterior ring on the tube for actuating said means.

2. A plurality of equi-power objective lenses, equal refractors oppositely angularly arranged on respective axes of the lenses, an annular, basal support and a tube splined therein and enclosing the lenses and the refractors and which is adjustable to focus the lenses, and means in said tube including a lever arm engaging one of the lenses and operative to radially shift it for changing the parallactic distance between the lenses to compensate for change of focus of the lenses and a ring on the front end of the tube for actuating the lever.

3. A lens unit having, in combination, a tube having a set of identic, common focus lenses, a mounting sleeve attachable to a camera and in which the tube is splined and having means for concurrently focussing the lenses, a refractor disposed on the axis of each lens to control incident pencils of light, and means including a device connected to one of the lenses for changing the axial distance between the lenses to compensate for parallactic changes due to adjustment for focus of the lenses.

4. A lens unit including a tubular, light-tunnel body, a set of relatively, laterally adjustable identic, co-focal objective lenses mounted in the inner end of the tunnel of the body, a refractor obliquely disposed on the axis of each lens in the tunnel, a basal sleeve medially surrounding said body for attaching to a camera and having means for shifting the said body axially to focus the lenses without axial change as to the refractors, and means including a ring on the outer end of said body for relatively laterally moving the lenses for parallactic control.

5. A lens unit having, in combination, a mounting sleeve adapted for attachment to a housing lens mount, a tubular body splined in the sleeve and having its inner end projecting inwardly beyond the sleeve mount and provided with binocular lenses, and means including an exterior collar arranged medially on said body and externally threaded on said sleeve for shifting the body in the sleeve to concurrently focus the lenses and means including an exterior ring in front of said collar for relatively shifting the lenses to change parallax.

6. An optical system having, in combination, a mounting barrel adapted for attachment to a housing, a tubular body in the barrel and having co-focal binocular lenses, and means for varying the inter-ocular distance between the lenses to compensate for changes of the object distance as to the camera; said body splined in the barrel and having an exterior collar threaded on the barrel and turnably engaging a grooved part of the body, and said means including an external cam ring mounted on the body in advance of said part and connected by an interior rocker arm, surrounded by the said collar, with one of said lenses to radially shift it.

7. An optical system having, in combination, a mounting barrel adapted for attachment to a housing, a tubular body splined for focal adjustment in the barrel and having co-focal binocular lenses in its innermost end, cam and rocking lever means for varying the inter-ocular distance between the lenses to compensate for changes of the object distance as to the camera, and a pair of para-plano divergent refractors in said body for increasing the parallax of pencils of light to the lenses.

8. An optical unit including a body having means for its ready attachment to a housing, co-focal lenses mounted in said body parallel to its axis, and control means including a cam ring turnable on the body and a rocker lever connection between the ring and one of the lenses whereby to laterally shift it as to the axis of the body the lever extending longitudinally of the body and interlocking in one end of the engaged lens.

9. An optical system having a mounting barrel, a tubular body splined in the barrel and projecting inwardly therethrough, a set of co-focal, parallel lenses mounted in the inner end of the body, an exterior ring threaded on the barrel and externally, turnably, connected by an anchor ring to said body so as to shift it for lens focus, and means mounted on said body and including a cam ring turnably mounted forwardly of said anchor ring, and a rocking lever engaged by the cam ring and extending therefrom toward the inner end of the barrel and connected with one of the lenses whereby to effect an inter-ocular adjustment thereof.

10. An optical system having a body member, a set of co-focal lenses mounted in the inner end of and parallel to the axis of said member and adapted for inter-axial adjustment, a ring turnably mounted on the front end of said body and having a cam groove, and a lever longitudinally recessed in said member and actuated and controlled by said cam groove and operatively interlocked to said lens set whereby to effect inter-axial adjustment thereof.

11. An optical system having a longitudinally slotted body member, a set of co-focal, equipower lenses mounted in one end and parallel to the axis of said member and one lens being fixed and one adapted for relative lateral shift, a ring turnably mounted on the opposite end of said member and having a cam groove, and a lever mounted in the slot of said member and engaging in said groove and interlocked to one of the lenses to effect its lateral adjustment inwardly or outwardly.

12. An optical unit comprising a mounting member for attachment to a housing, a tubular body splined in and projecting inwardly beyond said member, an anchor ring fixed with the forward portion of said body and having a peripheral groove, a screw-ring engaging a threaded part of said member and having a part engaged in said groove for rotation whereby to axially shift the body, a set of lenses mounted in the inner end of said body for relative inter-axial adjustment, and means operatively mounted on the body and including a rotary cam device and a lever actuated thereby and interlocked with one of said lenses for effecting the inter-axial adjustment of the lenses without changing the axial position of the body said lever being medially pivoted in a longitudinal groove in said body.

13. An optical unit for bodily attachment to a support and including the combination of an optical unit for bodily attachment to a support and including a mounting sleeve attachable to said support in front of the focal plane, a tubular body axially adjustable in the sleeve and its inner end projecting inwardly through the support and said sleeve close to the focal plane, a set of short focus lenses bodily positioned between the focal plane and said support mounted in the inner end of said body for relative interaxial adjustment and spaced a distance whereby to produce twin images transversely across a given film "frame" area, means including a part on the forward or outer end of the body to effect relative axial change between the lenses, and a para-plano parallax refractor disposed obliquely on the axis of and forwardly contiguous to each lens.

14. In an optical system, an elongated body member having a light tunnel, a medial partition across the tunnel having parallel-axial circular apertures which intersect on a chordal line adjacent to the axis and in the inner end of the tunnel, lenses arranged parallel to the axis of the tunnel and against the inner side of said partition and being relatively inter-axially adjustable therein and having chordal sides adjacent to the tunnel axis, and a diametrical light stopping partition, fixed in the tunnel, and extending from the cross-partition rearwardly and between the chordal faces of the lenses and a set of divergent, paraplano refractors forwardly of and contiguous to said partition.

15. A system as set forth in claim 14 and having an inner end closure for the tunnel provided with holes for emergent light from contiguous respective lenses, and a light partition extending from the lenses and through the end cover toward and close to the focal plane of the lenses.

16. Optical apparatus having a body member with a light tunnel, and a sleeve adjustably supporting it for focal change parallel, relatively laterally movable lens mounts symmetrically disposed in the inner end of the member around the tunnel axis, a refractor barrel fixed in the tunnel with a fixed frontal refractor for each lens and means for effecting relative movement of the mounts and including an exterior manual control ring on said member and a lever operated thereby and extending between said sleeve and said member and interlocking with one of the lenses to laterally shift it as to its refractor.

17. An optical apparatus including a longitudinally slotted body member having a light tunnel, parallel lenses with a common focal plane mounted in the inner end of the tunnel, and means for inter-axially relatively adjusting the lenses and including a shiftable lens block, a rotative exterior control ring, and a rocking lever mounted in the slot in said member and forming an operative connection between said ring and the mount, a mounting sleeve in which said member is splined and through said lever extends from said ring to said block, an anchor ring on said member rearwardly of the control ring, and a focussing collar connected to said anchor ring and threaded on said sleeve, and an index annulus forming a part of said sleeve and into which the focussing ring telescopes.

18. Apparatus for adapting a standard motion picture camera for use in making multiple, stereoscopic images concurrently on a single "frame" of a given film, comprising: aperture plate means for establishing plural image apertures at the film focal plane within the "frame" area, and a lens unit bodily applicable to the camera lens mount and including a lens carrier having its inner end extended through the lens mount and in contiguity with said plate means, and provided with equal, parallel, short focus lens sets which are relatively laterally adjustable to change the parallax of images focussed at said apertures, means for shifting the carrier to focus the lenses, oblique refractors in front of the lenses in the carrier, and means for relatively laterally adjusting the lens sets.

19. Apparatus of the class set forth, having a lens carrier provided with co-focal lens sets, means to relatively laterally adjust the lens sets, means to focally adjust the lenses concurrently, and a set of paraplano refractors fixed in front of the lenses in the carrier and oblique to their axes and convergently meeting on the axis of the carrier whereby to change the distance between separate beams of light from an object scene to the respective lens of the set.

20. A lens unit, for changing a single-lens, motion picture camera having a lens mount and a focal plane, aperture plate on the optical axis to make stereoscopic images within the usual "frame" area of the given film width for the camera; including means to establish the requisite, separate apertures at the plate, and a lens organization including a mounting sleeve for attachment to the said mount without any material change thereof, a tubular body member axially adjustable in and projecting through the sleeve and into contiguity with the aperture plate focal plane, parallel, stereo-lenses relatively adjustably mounted in the inner end of said member, paraplano refractors fixed divergently on the axes of and outwardly adjacent to the said lenses, and exterior control rings on said member and in front of the lens mount sleeve whereby to focus the lenses and relatively vary their lateral positions to control their parallax according to focal distance.

21. A lens unit as set forth in claim 20, and each lens having a mounting block removably arranged in the carrier member, and an operative connection between one of the said blocks and one of the control rings.

22. A stereoscopic lens unit, for bodily replacing the single lens of a standard motion picture camera and having means for positioning a short focus, stereo-lens set in juxtaposition to the normal focal plane of the camera, comprising: a mounting sleeve complementary to the lens mount of the camera, an elongated, tubular lens carrier focally adjustable in the sleeve, a focussing ring screwed on the sleeve and turnably attached to the carrier, said carrier having a reduced inner end extending into juxtaposition to the focal plane and provided with short focus lenses for forming stereoscopic images within the normal "frame" of the given film, a parallax control ring turnable on the carrier and having a connection extending axially in the carrier and interlocked with one of the lenses to shift it laterally to vary the parallax according to focal distance, and oblique refractors on the axes of the lenses.

23. A stereo-lens unit comprising a basal sleeve having a reduced inner end to enter the usual lens mount of a standard motion picture camera and having an externally threaded part, an elongated tubular body the medial portion of which is splined in said sleeve and the rear end of which extends through said reduced sleeve end and has a transverse lens chamber from side to side of the body, a guard ring mounted on the inner end of the body and closing the transverse ends of the chamber, a pair of diametrically opposite blocks fitted in the chamber and being relatively separable and having para-axial lenses of equal focus, a device interlocked with one of the blocks and extending to the forward end of said body and engaging an external cam ring rotative on said body to vary the parallax of the lenses, and a focussing ring rotative on said body and engaging the threaded part of the basal sleeve, and a lens retaining disc on said body.

24. A lens unit as set forth in claim 23, and having a tube fixed medially in said body and having a set of paraplano refractors which diverge from a point on the body axis contiguous to said lenses and lie across their axes, and a diametrical light stop extending between the lenses and from the refractors to the focal plane; said disc having light apertures on the axes of the adjacent lenses.

KARL R. HOYT.